(12) United States Patent
Do et al.

(10) Patent No.: US 8,106,890 B2
(45) Date of Patent: Jan. 31, 2012

(54) SLIDE BASED TECHNIQUE FOR INPUTTING A SEQUENCE OF NUMBERS FOR A COMPUTING DEVICE

(75) Inventors: Lydia M. Do, Raleigh, NC (US);
Pamela A. Nesbitt, Tampa, FL (US);
Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 12/098,692

(22) Filed: Apr. 7, 2008

(65) Prior Publication Data

US 2009/0251420 A1 Oct. 8, 2009

(51) Int. Cl.
*G06F 3/041* (2006.01)

(52) U.S. Cl. .................................. 345/173; 715/700

(58) Field of Classification Search .......... 345/173–179; 178/18.01
See application file for complete search history.

(56) References Cited

U.S. PATENT DOCUMENTS

| | | | |
|---|---|---|---|
| 6,295,050 B1 | 9/2001 | Kumhyr et al. | |
| 7,250,938 B2 | 7/2007 | Kirkland et al. | |
| 7,453,439 B1 * | 11/2008 | Kushler et al. | 345/168 |
| 7,519,918 B2 * | 4/2009 | Trantow | 715/778 |
| 2008/0204423 A1 * | 8/2008 | Kim | 345/173 |

* cited by examiner

*Primary Examiner* — Kevin M Nguyen
*Assistant Examiner* — Kenneth B Lee, Jr.
(74) *Attorney, Agent, or Firm* — Patents On Demand P.A.; Brian K. Buchheit; Scott M. Garrett

(57) ABSTRACT

A contact with a point of a touch input component of a computing device can be sensed. A continuous contact from the point to a different point on the touch input component can be detected that is caused by a first slide based motion of a contact instrument maintaining contact with the touch input component. A first input character associated with the slide based motion can be determining based at least in part upon a direction of the slide based motion. A second slide based motion of the contact instrument can be detected from the different point to another point, wherein the contact instrument remains in contact with the touch input component during the first slide based motion, during the second slide based motion, and between the first and second slide based motion. A second input character associated with the slide based motion can be determined based at least in part upon a direction of the second slide based motion.

16 Claims, 3 Drawing Sheets

SLIDE BASED TECHNIQUE FOR INPUTTING A SEQUENCE OF NUMBERS FOR A COMPUTING DEVICE

BACKGROUND OF THE INVENTION

The present invention relates to the field of telephony devices and, more particularly, to using a slide based technique for inputting a sequence of numbers.

Touch sensitive interfaces, such as touch sensitive displays are becoming more prevalent in many devices. Mobile telephony devices, for example, have begun incorporating touch sensitive displays. These displays are especially convenient for space constrained, multifunction mobile devices, as they can be reconfigured dynamically, as opposed to a fixed physical dial pad where the dial pad buttons consume device space even when the mobile device is operating in modes where the dial pad is extraneous. Touch sensitive interfaces are also becoming increasingly prevalent in kiosk devices and surface based computing devices, often due to the ability to interact in a dynamically configurable fashion.

Despite numerous advances in user input technologies and advances in other areas of input (specifically multi-touch technologies), an act of inputting numbers, such as phone numbers, has undergone very few changes. Specifically, number pads are a common input methodology, whether the number pads are implemented as a number of arranged physical buttons or implemented dynamically within touch-sensitive displays. When implemented in a touch-sensitive display each individual number from the virtual number pad must be tapped in a sequence to enter a set of numbers. This methodology is often error prone, as it is easy for a user to inadvertently press a touch-screen portion reserved for a non-desired digit. This problem is exasperated on relatively small screen surface spaces, since the closer a set of touchable numbers are to each other, the more likely an occurrence of erroneous presses. Further still, touching a numeric sequence on a keypad (e.g., dialing a phone number) requires a user to focus intently upon a touch pad, which can be dangerous when conducted concurrently with other activities, such as driving. Additionally, security considerations exist with this methodology, as it is easy for an observer to determine a user entered numeric sequence, such as a personal identification number (PIN), based upon observable finger placement and movement.

BRIEF SUMMARY OF THE INVENTION

One aspect of the present invention can include a method, apparatus, computer program product, and system for a slide based motion for inputting characters within a device. A contact with a point of a touch input component of a computing device can be sensed. A continuous contact from the point to a different point on the touch input component can be detected that is caused by a first slide based motion of a contact instrument maintaining contact with the touch input component. A first input character associated with the slide based motion can be determining based at least in part upon a direction of the slide based motion. A second slide based motion of the contact instrument can be detected from the different point to another point, wherein the contact instrument remains in contact with the touch input component during the first slide based motion, during the second slide based motion, and between the first and second slide based motion. A second input character associated with the slide based motion can be determined based at least in part upon a direction of the second slide based motion.

Another aspect of the present invention can include a computing device configured to accept slide based motions as input that includes a touch input component and a slide interpretation engine. The touch input component can include a region for sensing input. The touch input component can be configured to sense a proximity of a contact instrument to a surface of the touch input component and a path along the region that the contact instrument travels assuming the contact instrument maintains proximity to the contact instrument from one point to another within the region. Generally, this means that the contact instrument (e.g., finger, stylus, etc.) is slid along the surface. It does, however, include circumstances where direct contact with the surface is unnecessary (e.g., magnetically coupled styluses that only need to be "close" to the surface to be considered as touching the surface). The slide interpretation engine can be a hardware/software/firmware engine that interprets slide based motions performed by the contact instrument for the touch input component. The slide interpretation engine can interpret a series of consecutive slide based motions made without removing the contact instrument from the proximity of the touch input component as a sequence of characters, which a user has input to a computing device through the slide based motions.

DETAILED DESCRIPTION OF THE INVENTION

Figure 1:
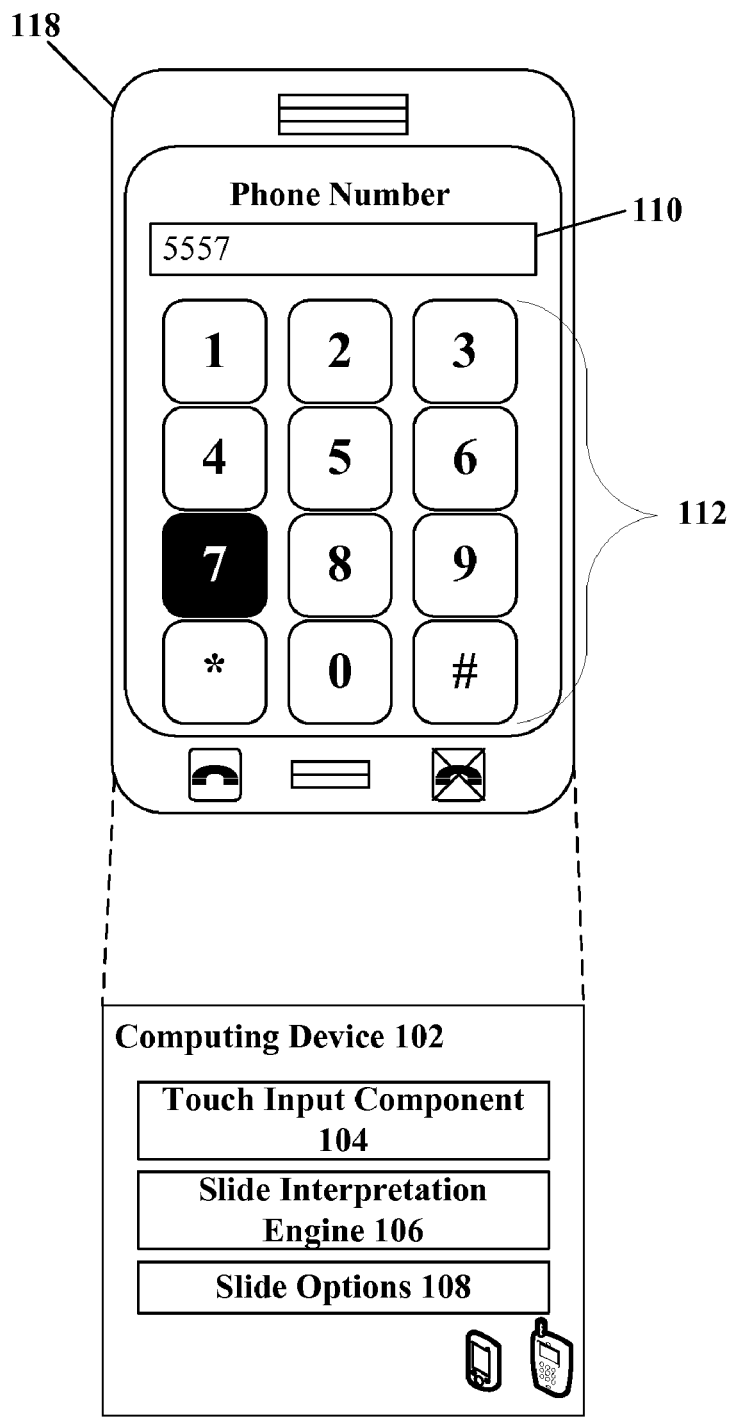
FIG. 1 is a schematic diagram of a system for using a touch input component for entering a sequence of "numbers" in accordance with an embodiment of the inventive arrangements disclosed herein.

The present invention discloses a slide-based technique for inputting a sequence of numbers. According to this technique, a user can use a slide based motion on a touch screen or any touch sensitive surface, such as a force sensitive resistor (FSR). A slide based motion can be an action when a user presses their finger, stylus, or other contact instrument on an object on the display and moves their contact instrument in a desired direction, therefore "sliding" the contact instrument across the display surface. A sequence of numbers can be input by performing different sliding actions, all without requiring a user raising the contact instrument from the touch sensitive input device. Although largely expressed in terms of a number pad, the sliding entry technique presented herein is not limited to numbers but can be used as a substitution for any key press input, including numbers, symbols, and the like.

In one number arrangement, the numbers can be presented in a manner common to a telephone number pad. In this arrangement, the numbers would need to be adjacent to allow a user to use a sliding gesture to dial without lifting their contact instrument. In another arrangement, the numbers can be presented in a circular manner. In yet another arrangement, the numbers can be presented around a "target box." This "target box" can be an area designated for a user to slide numbers into. A user can use a slide gesture to drag numbers outside of the box into it into their appropriate places to form a full number to dial. It is contemplated that only some or all of these arrangements can be present in certain embodiments of the invention and that these arrangements can be fully configurable, or even disabled, to any arbitrary level.

It should be appreciated that the "sliding" entry technique expressed herein can be advantageous in many circumstances over traditional one-touch-per-number techniques. First, sliding actions can be less error prone than touches, as a sliding direction, a start position, and an end position can all be factors taken into consideration, as opposed to a single point of impact upon which conventional touch entry systems are based. The sliding technique can be accurately implemented on a smaller touch region than that required for a conventional keypad, as smaller input regions do not necessarily result in a smaller "target" touch area. The sliding technique can be less harsh on a human operator from an exercise physiological perspective (i.e., traditional entry mechanisms often result in carpel tunnel syndrome due to their inherent discord between body mechanics and key press input demands). The sliding technique can provide added security, as onlookers can have a difficult time discerning a sequence of numbers based upon finger movements and positioning. This can be especially true in implementations where user configurable touch-entry mechanisms can be altered (e.g., sliding motions can be arranged and interpreted in a variety of different manners which can even be changed randomly to minimize hazards to onlooker security code discernment).

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for using a touch input component for entering a sequence of "numbers" in accordance with an embodiment of the inventive arrangements disclosed herein. In system 100, computing device 102 can include a touch input component 104 and slide interpretation engine 106. Touch input component 104 and slide interpretation engine 106 can work together to provide the functionality described herein on computing device 102. Display 118 can be a representation of touch-screen or other visual output/input region of computing device 102. For example, display 118 can include phone number display upon a touch-sensitive screen of a mobile phone (one embodiment of device 102). The display 118 shows one contemplated arrangement for a set of numbers 112 (e.g., a number pad arrangement) that is slide-input enabled. Display 118 can also include a "running" number element 110, which shows a current number being input. As a user performs slide based motions using a contact instrument against the touch input component 104, representative numbers corresponding to the user's input can be dynamically expressed in the number element 110. Slide interpretation engine 106 can include a set of programmatic instructions that interprets the sliding motions against the touch input component 104 as distinctive "numbers". In one embodiment, the motions and corresponding numbers can be configurable by a device 102 user and/or by an input receiving application executing upon device 102.

As used herein, a slide based motion refers to a detectable motion in which a contact instrument is moved from one point of a touch input surface to another point without raising the contact instrument from the surface. A direction of the movement can be programmatically determined and can be an important factor in ascertaining a meaning ascribed to this movement. For example, a slide based movement from a center of a touch input surface to an upper right corner of the surface can be interpreted differently than a slide based movement from the bottom right corner of the surface to the upper right corner. Further, tapping (where a contact instrument is raised from a touch sensitive surface) a center of a surface followed by tapping the upper right corner of the surface can be interpreted differently from a side-based motion from the center to upper right corner of the surface.

The slide-based motions implemented for device 102 can permit a user to enter a sequence of consecutive numbers without necessarily raising a contact instrument from a surface of a touch input component 104, although raising the contact instrument can be permissible as well. For example, in one arrangement a delay of a designated period (e.g., one second) can cause a subsequent motion to be interpreted separately from a current motion. In another arrangement, a secondary input (e.g., pressing a button or providing a secondary touch in a multi-touch interface) can be used to distinguish a first sliding motion from a second sliding motion, each of which are to be interpreted independently of the other. A secondary input can also be used to represent multiple usages of a number. For example, a user can place their hand or otherwise tap a surface as they select a number four using a sliding motion, where the hand/tap signifies that two copies of the number four are to be input.

A definition of "number" as used herein is to be interpreted expansively to include digits, symbols, characters, expressible icons, and the like. Basically a number can be any individual unit or element that a user can select using a slide based motion as described herein. This includes digits from zero to nine and symbols traditionally on a number pad (e.g., the "*" and the "#" signs). It also includes letters, ASCII characters, symbols (e.g., wingdings, webdings, emoticons, mathematical symbols, etc.), application choices (e.g. call history, messaging, tools, contacts, calendar, missed calls, to-do, etc.), and the like.

A contact instrument can include any object able to be pressed against a surface of a touch input component 104, which can be slide via a slide-based motion across the surface and interpreted by the slide interpretation engine 106. The contact instrument can include a finger of a user, a stylus, or any other object. In one embodiment, any object touched to a surface can be interpreted. In another embodiment, only a specific object (e.g., a special stylus specifically designed be detected by component 104) or user (e.g., only an authorized user is granted permission to input dial-out numbers or long distance numbers through device 102) can produce discernable input; meaning that touches from a finger would be ignored when a special stylus is required.

The touch sensitive component 104 can include any surface configured to detect and interpret a slide-based motion. In one embodiment, physical contact with the touch sensitive surface 104 is not necessary as physical proximity of a contact instrument to the surface of component 104 is sufficient. For example, many "touch sensitive" computing tablets (especially those having a glass, non-flexible display) are coupled magnetically to a stylus, where motions of the stylus can be interpreted when within a half-inch or so of the display surface. The touch sensitive component 104 can be an integrated component of device 102 or can be a peripheral coupled to device 102. An example of a peripheral implementation for component 104 can include a number pad (or keyboard, touchpad, etc) designed for accepting input from a contact instrument. In one embodiment, the touch sensitive component 104 can be a touch-sensitive display, upon which selectable symbols (e.g., "numbers") can be dynamically displayed. In another embodiment, the touch sensitive component 104 can be an input-only component, such as force sensitive resistor (FSR) or a notebook touchpad. An input-only implementation of component 104 can optionally include permanently printed (to be interpreted to include Braille, etched, or otherwise displayable) "numbers" able to direct a user's motions in appropriate ways. For example, a touch-pad can include printed numbers in a circular arrangement for "slide dialing" as shown in arrangement 220 of FIG. 2.

The slide interpretation engine 106 can be implemented as software, firmware, and hardware and can include a plurality of machine readable instructions stored on a computing device usable medium that causes the computing device to interpret slide based motions as user input designating "numbers." In one embodiment, engine 106 can use a set of user configurable slide options 108, which change a manner in which slide motions are interpreted. For example, the slide options 108 can increase/decrease sensitivity and can active one of a multitude of possible slide interpretation modules each using a different motion interpretation scheme.

A few contemplated slide interpretation schemes are discussed in detail in arrangements 202, 220, and 302. The invention is not to be construed as limited in this regard, and other slide interpretation schemes are to be considered within the scope of the invention. For example, in one embodiment, a sliding direction (bottom to top, left to right, right to left, top left corner to bottom right corner, etc.) can be mapped to different numbers. Non-linear motions (e.g. circular sliding motions) motions with different widths (e.g., sliding two fingers instead of one), and the like can also be mapped to different numbers in different embodiments utilizing different contemplated slide interpretation schemes having associated slide interpretation modules. In one embodiment, new slide interpretation modules can be plug-able, so that a device 102 can be upgraded to new module interpretation schemes through software/firmware updates.

The computing device 102 can be any device capable of receiving and interpreting slide based motions. The computing device can optionally include telephony components, which permit telephony communications and phone dialing using slide based motions. In various implementations, the computing device 102 can be a mobile phone, a surface based computing device, a kiosk, a personal data assistant, a personal computer, an in-vehicle navigation system, a PIN or zip-code accepting point of sale system, a security system accepting authorization input, and the like.

Figure 2:
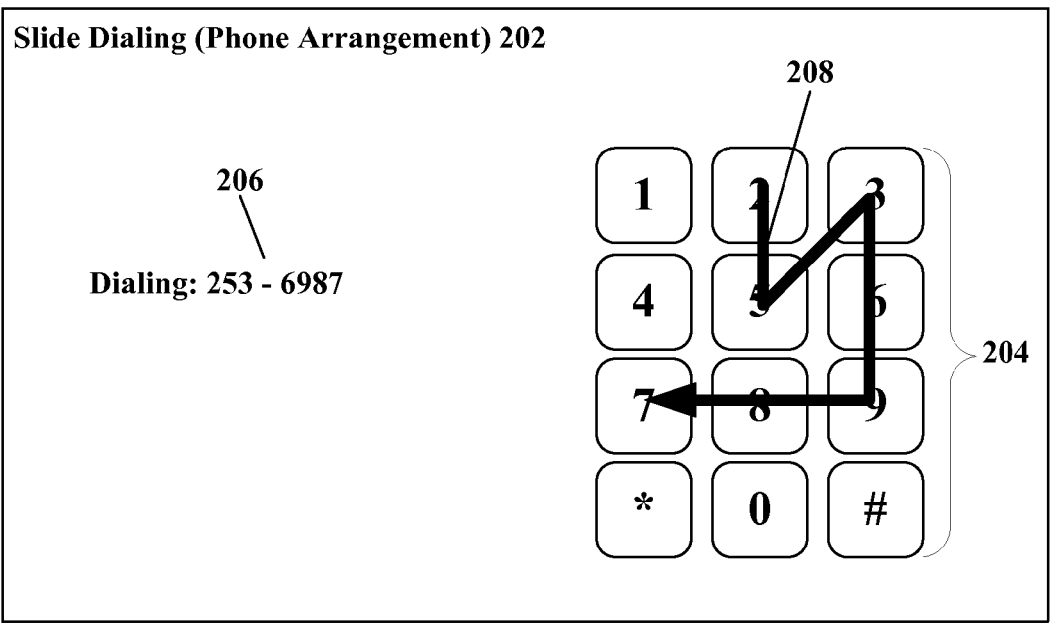
FIG. 2 is a diagram showing arrangements for using slide interpretation scheme associated with dialing phone numbers in accordance with an embodiment of the inventive arrangements disclosed herein.
Figure 2:
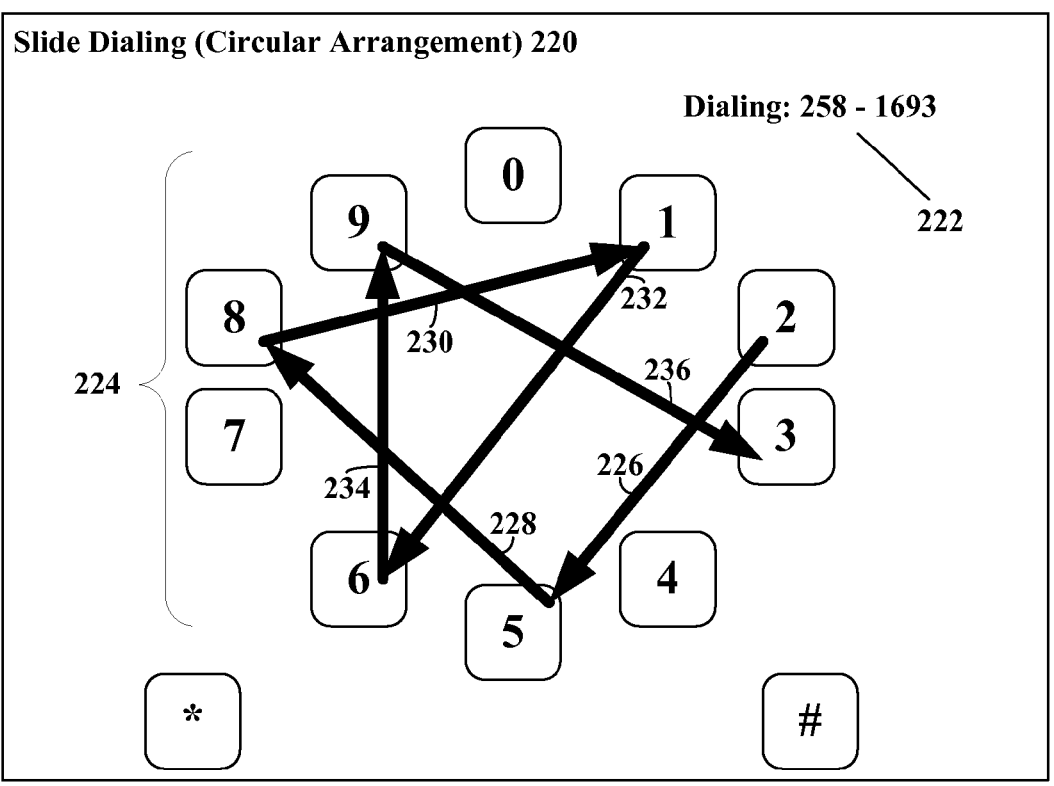

FIG. 2 is a diagram showing arrangements 202, 220 for using slide interpretation scheme associated with dialing phone numbers in accordance with an embodiment of the inventive arrangements disclosed herein. Although the arrangements 202, 220 show a phone arrangement for dialing numbers, similar slide interpretation schemes are to be assumed to exist for other contexts, such as inputting alphanumeric characters, symbols, or selecting application options. The schemes illustrated in arrangements 202 and 220 can be applied in a context of system 100.

Arrangement 202 can show a number pad 204 arrangement in the manner of a common phone number pad. In this arrangement, the user can be dialing number phone number 206 (253-6987). The user can slide their contact instrument over the appropriate numbers in number pad 204 to dial phone number 206. The direction in which the user would slide their contact instrument is illustrated by direction 208. Each time a contact instrument is slid over a particular digit of the number pad 204, an input for that digit is interpreted. Sensitivity adjustments are contemplated to improve accuracy and to minimize unintended interpretations. For example, one sensitivity adjustment can require a sliding motion to pass proximate to a center potion of a displayed region for a digit.

It should be noted that arrangement 202 permits extremely rapid entry of a sequence of numbers, as a contact instrument need not be lifted from a touch sensitive surface. Further, it should be appreciated that as arrangement 202 increases in popularity and usage, numbers lending themselves to rapid entry through arrangement 202 can become "premium" phone numbers in high demand.

In arrangement 220, number pad 224 can be arranged in a circular pattern so that when a user slides their finger, they can reach a number without sliding over another number. This can reduce errors when trying to dial a number using slide dialing. In arrangement 220, the user can be dialing phone number 222 (258-1693) and can slide their contact instrument over the appropriate numbers in number pad 224. The direction in which the user would slide their contact instrument is illustrated by direction arrows 226-236. An elaboration of arrangement 220 designed to minimize false interpretations can require a user slide the contact instrument to a center point of the number "circle" between numbers. That is, the center of the number circle indicates a desire to enter a different digit via a slide based motion.

Figure 3:
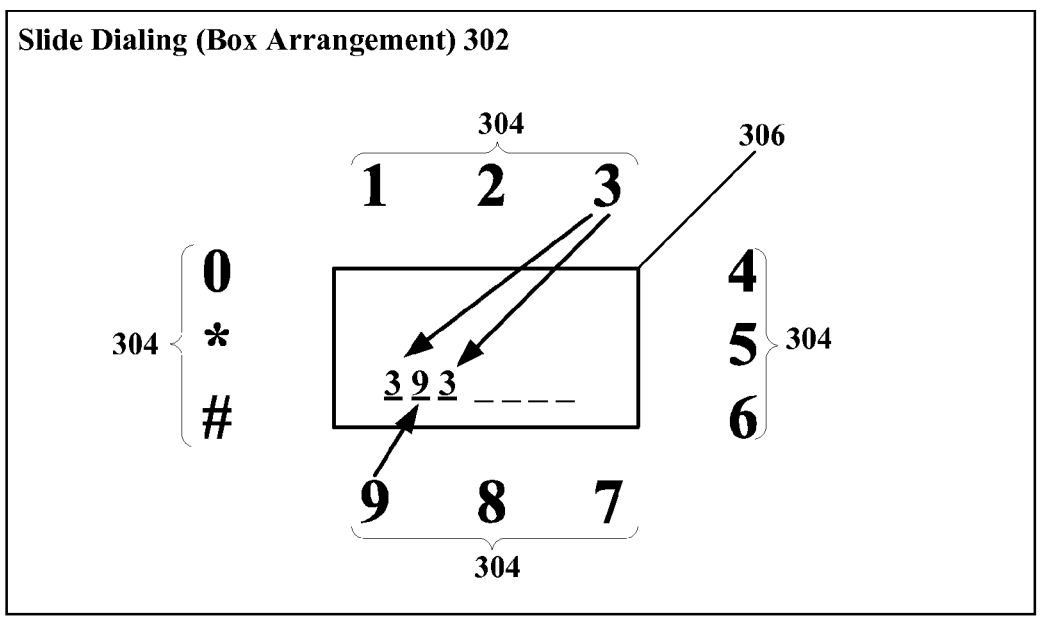
FIG. 3 is a diagram showing a slide interpretation scheme and a slide dialing configuration interface in accordance with an embodiment.
Figure 3:
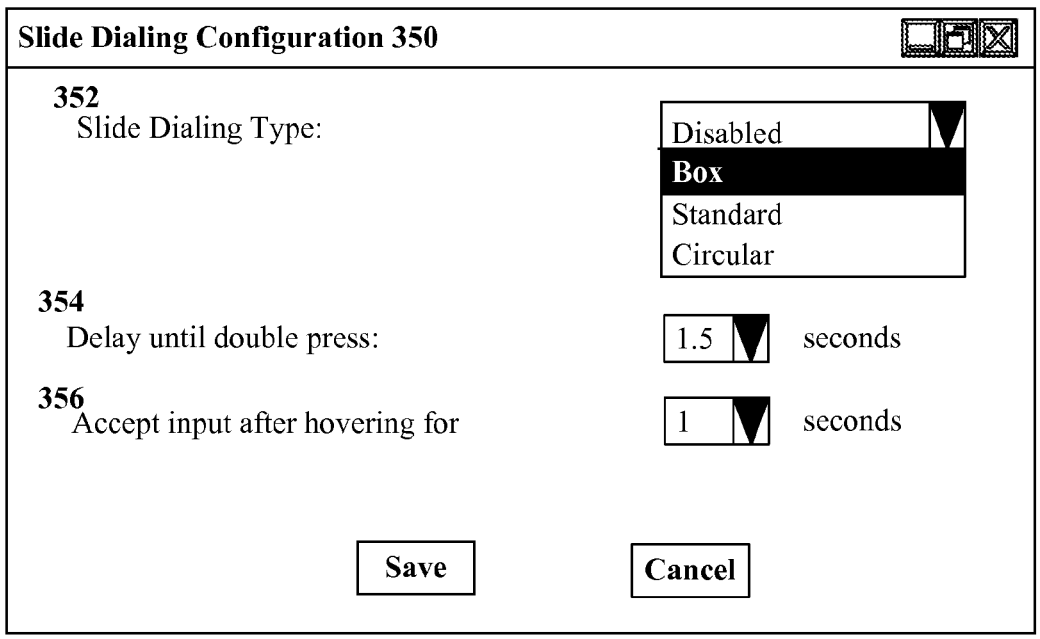

FIG. 3 is a diagram showing a slide interpretation scheme 302 and a slide dialing configuration interface 350 in accordance with an embodiment. Although the arrangements 302 shows a phone arrangement for dialing numbers, similar slide interpretation schemes are to be assumed to exist for other contexts, such as inputting alphanumeric characters, symbols, or selecting application options. Specifics of configuration interface 350 are for illustrative purposes only and are not to be interpreted as limitations of the invention. That is, the options, arrangement, and interface elements for configuring the slide-dialing shown in interface 350 can vary depending on implementation specifics. The scheme illustrated in arrangement 302 and the configuration interface 350 can be applied in a context of system 100.

In arrangement 302, number bank 304 can be arranged around the dial box 306. Dial box 306 can show the current numbers accepted as input to be dialed. The user can slide numbers from number bank 304 into dial box 306 and place them into the correct spot for the number to dial. An alternate implementation of arrangement 302 can provide a slide "target" that is separate from an interface control in which a "running" number is presented. For example, a circular region can be a target area to which selected numbers 304 are to be dragged.

In one embodiment of arrangement 302, multiple numbers can be concurrently dragged into the dial box 306 using different slide-based motions. For example, a user can drag three different numbers (e.g., 360) to the dial box concurrently using different fingers. A sequence of the multiple numbers placed in the box 360 can be based upon an order that the contact instrument makes contact with the box 306. For example, for the sequence 3-6-0, the contact instrument (e.g., finger) associated with the number "3" can first enter box 360, followed by the contact instrument associated with the number "6" entering box 360, followed by the contact instrument associated with the number "0".

In one embodiment, multiple users (e.g., users sitting around a surface based computing device, for example) can interactively create a sequence of numbers. In one arrangement, when multiple users input a number each user can be associated with a portion of the sequence. So a first user (UserA) can be responsible for a first three numbers in an ordered sequence of seven numbers and a second user (UserB) can be responsible for a last four numbers of the sequence. Hence, when an order of entry is as follows: UserA enters "3"; UserB enters "2"; UserB enters "4"; UserA enters "6"; UserB enters "3"; UserA enters "0"; UserB enters "1", then the first three numbers entered by UserA "3-6-0" are the first three numbers in a sequence of seven numbers and the first four numbers entered by UserB "2-4-3-1" are the last four numbers in the sequence of seven. Hence the input from UserA and UserB would form a sequence "360-2431". In another arrangement, even when multiple users are involved, a sequence order can be determined upon an order of entry completion. In such an arrangement the above example where UserA and UserB provided input would form a sequence "324-6301".

Slide dialing configuration interface 350 can be an example interface for configuring slide dialing. Slide dialing configuration 350 can include options such as slide dialing type 352, delay until double press 354, and accept input after hovering

356. Option 352 can be an option to adjust a slide interpretation scheme. As shown, selectable options include a box, a phone, and a circular interpretation scheme. Option 354 can be an option to configure the delay until a double (or single) press is accepted for a number. A double press can be through a control other than a touch sensitive surface, such as a control that a different finger is controlling. In another embodiment, a touch sensitive surface itself can be pressure sensitive and option 354 can specify an amount of pressure to be applied before a touch/slide based motion is interpreted as an intentional user input. A hover value 356 can represent a minimum time that a contact instrument remains relatively stationary over a digit before that contact is interpreted as intentional. The configuration options of interface 350 are for illustrative purposes only and other options are contemplated.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for using and interpreting a slide based motion for input comprising:

sensing a contact with a point of a touch input component of a computing device;

detecting a continuous contact from the point to a different point on the touch input component caused by a first slide based motion of a contact instrument maintaining contact with the touch input component;

determining based at least in part upon a direction of the slide based motion a first input character associated with the slide based motion;

detecting a second slide based motion of the contact instrument from the different point to another point, wherein the contact instrument remains in contact with the touch input component during the first slide based motion, during the second slide based motion and between the first and second slide based motion;

determining based at least in part upon a direction of the second slide based motion a second input character associated with the slide based motion;

presenting a plurality of digits on the touch input component, wherein said presented plurality of digits inform a user regarding a manner in which said slide based motions will be programmatically interpreted; and arranging the presented plurality of digits such that the arrangement comprises an ordered three-by-three table of digits from one-to-nine, wherein one row of the table comprises digits one, two, and three, wherein another row of the table comprises digits four, five, and six, wherein still another row of the table comprises digits seven, eight, and nine.

2. The method of claim 1, wherein the touch input component is a touch sensitive display, further comprising:

displaying the plurality of digits on the touch sensitive display, wherein the determined first input character and the determined second input character are displayed ones of the plurality of digits, wherein a positioning of the displayed plurality of digits corresponds to a determination of which input character is determined in accordance with a slide interpretation scheme.

3. The method of claim 2, wherein the different point of the touch sensitive screen corresponds to a display of the first input character, and wherein the another point of the touch sensitive screen corresponds to a display of the second input character.

4. The method of claim 2, wherein the touch sensitive display comprises a drag target input element configured to accept a dragging of a displayed character, said method further comprises:

sensing a movement of the contact instrument from the different point to an intermediary point and from the intermediary point to the another point of the touch sensitive display, wherein the different point and the another point correspond to a display of the drag target input element, and wherein the point corresponds to a display of the first input character, and wherein the intermediary point corresponds to a display of the second input character.

5. The method of claim 2, wherein the slide interpretation scheme is user configurable.

6. The method of claim 2, wherein the touch sensitive display is a display of a telephony device configured to display the plurality of digits comprising digits from zero to nine for phone number dialing purposes, wherein the first input character and the second input character comprise digits of a user input phone number to be handled by the telephony device.

7. The method of claim 1, wherein the method further comprising:

detecting a plurality of additional slide based motions occurring by the contact instrument moving proximate to a surface of the touch input component, wherein while the slide based motions are being made, the contact instrument maintains contact with the touch input component;

programmatically interpreting the first slide based motion, the second slide based motion, and the additional slide based motions as an ordered sequence of at least seven characters.

8. The method of claim 7, wherein the at least seven characters comprise numbers, and wherein said sequence represents a phone number input into a telephony device comprising the touch input component.

9. The method of claim 1, further comprising:
presenting a drop region, wherein a slide based motion from any of the presented digits to the drop region is programmatically interpreted as a selection of the presented digit from which the slide based motion originated.

10. The method of claim 1, further comprising:
sensing a second contact with a different point of the touch input component of the computing device concurrent with at least one of the first slide based motion and the second slide based motion; and
based upon the second contact, increasing an ordered repetition of said associated input character, wherein when concurrent with the first slide based motion at least two inputs for the first input character are determined, and wherein when concurrent with the second slide based motion at least two inputs for the second input character are determined.

11. The method of claim 1, wherein at least a portion of said second slide based motion occurs concurrent with at least a portion of said first slide based motion.

12. The method of claim 11, wherein an order of said first input character relative to said second input character is determined based upon a completion order of the first slide based motion and the second slide based motion.

13. A computer program product for using and interpreting a slide based motion for input, the computer program product comprising:
a non-transitory computer usable storage medium having computer usable program code embodied therewith, the computer usable program code comprising:
computer usable program code configured to sense a contact with a point of a touch input component of a computing device;
computer usable program code configured to detect a continuous contact from the point to a different point on the touch input component caused by a first slide based motion of a contact instrument maintaining contact with the touch input component;
computer usable program code configured to determine based at least in part upon a direction of the slide based motion a first input character associated with the slide based motion;
computer usable program code configured to detect a second slide based motion of the contact instrument from the different point to another point, wherein the contact instrument remains in contact with the touch input component during the first slide based motion, during the second slide based motion and between the first and second slide based motion;
computer usable program code configured to determine based at least in part upon a direction of the second slide based motion a second input character associated with the slide based motion;
computer usable program code configured to present a plurality of digits on the touch input component, wherein said presented plurality of digits inform a user regarding a manner in which said slide based motions will be programmatically interpreted; and
computer usable program code configured to arrange the presented plurality of digits such that the arrangement comprises an ordered three-by-three table of digits from one-to-nine, wherein one row of the table comprises digits one, two, and three, wherein another row of the table comprises digits four, five, and six, wherein still another row of the table comprises digits seven, eight, and nine.

14. A computing device configured to accept slide based motions as input comprising:
a touch input component comprising a region for sensing input, said touch input component being configured to sense a proximity of a contact instrument to a surface of the touch input component and a path along the region that the contact instrument travels assuming the contact instrument maintains proximity to the contact instrument from one point to another within the region;
a slide interpretation engine comprising computing device usable code stored in a device readable medium configured to interpret slide based motions performed by the contact instrument for the touch input component, wherein the slide interpretation engine is configured to interpret a plurality of consecutive slide based motions made without removing the contact instrument from the proximity of the touch input component as a sequence of a plurality of characters, which a user has input to a computing device through the slide based motions; and
a touch sensitive display linked to the touch input component, wherein the region is presented within the touch sensitive display, said region presenting a plurality of digits on the touch input component, wherein said presented plurality of digits inform a user regarding a manner in which said slide based motions will be programmatically interpreted, within said region arranging the presented plurality of digits such that the arrangement comprises an ordered three-by-three table of digits from one-to-nine, wherein one row of the table comprises digits one, two, and three, wherein another row of the table comprises digits four, five, and six, wherein still another row of the table comprises digits seven, eight, and nine.

15. The computing device of claim 14, wherein the touch input component is a touch sensitive display, wherein a mobile telephony device comprises the touch sensitive display and the slide interpretation engine, wherein said touch sensitive display is configured to display a phone number dialing interface through which phone numbers are able to be entered via user performed slide based motions interpreted by the slide interpretation engine, wherein said slide interpretation engine is configured to interpret motions made by the contact instrument on the touch sensitive display as a consecutive sequence of at least nine digits for a phone number when the contact instrument is moved about the touch sensitive display in a sequence of motions without raising the contact instrument from a detectable proximity of the touch sensitive display.

16. The computing device of claim 14, further comprising:
a slide options component comprising computing device usable code stored in a device readable medium configured to permit a user of a device comprising the touch input component and the slide interpretation engine to modify a slide interpretation scheme used by the device.

* * * * *